(12) United States Patent
Prabhu Muraleedhara Prabhu

(10) Patent No.: US 12,081,395 B2
(45) Date of Patent: Sep. 3, 2024

(54) FORMAL VERIFICATION OF NETWORK CHANGES

(71) Applicant: VMware LLC, Palo Alto, CA (US)

(72) Inventor: Santhosh Prabhu Muraleedhara Prabhu, Urbana, IL (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/410,915

(22) Filed: Aug. 24, 2021

(65) Prior Publication Data

US 2023/0065379 A1 Mar. 2, 2023

(51) Int. Cl.
*H04L 41/0816* (2022.01)
*H04L 41/08* (2022.01)
*H04L 41/14* (2022.01)
*H04L 47/2441* (2022.01)

(52) U.S. Cl.
CPC ...... *H04L 41/0816* (2013.01); *H04L 41/0886* (2013.01); *H04L 41/14* (2013.01); *H04L 47/2441* (2013.01)

(58) Field of Classification Search
CPC . H04L 41/0816; H04L 41/0886; H04L 41/14; H04L 47/2441
USPC ........................................................ 709/224
See application file for complete search history.

(56) References Cited

U.S. PATENT DOCUMENTS

| | | | |
|---|---|---|---|
| 6,118,760 A | 9/2000 | Zaumen et al. | |
| 6,792,423 B1 | 9/2004 | Jeffries et al. | |
| 6,834,139 B1 | 12/2004 | Prairie et al. | |
| 7,079,544 B2 | 7/2006 | Wakayama et al. | |
| 7,089,240 B2 | 8/2006 | Basso et al. | |
| 7,194,661 B1 | 3/2007 | Payson | |
| 7,349,382 B2 | 3/2008 | Marimuthu et al. | |
| 7,702,630 B2 | 4/2010 | Basso et al. | |
| 7,827,591 B2 | 11/2010 | Sharma et al. | |
| 8,693,344 B1 | 4/2014 | Adams et al. | |

(Continued)

FOREIGN PATENT DOCUMENTS

| | | |
|---|---|---|
| WO | 2012093429 A1 | 7/2012 |
| WO | 2012126488 A1 | 9/2012 |
| WO | 2015006354 A1 | 1/2015 |

OTHER PUBLICATIONS

Berde, Pankaj, et al., "ONOS Open Network Operating System An Open-Source Distributed SDN OS," Dec. 19, 2013, 34 pages.

(Continued)

*Primary Examiner* — Karen C Tang
(74) *Attorney, Agent, or Firm* — Quarles & Brady LLP

(57) ABSTRACT

A network insight system that performs intent verification of network changes is provided. The system generates a first model of a network comprising a first set of one or more rule tables, each rule table described by one or more flow nodes. The system generates a second model of the network comprising a second set of one or more rule tables. Each rule table is described by one or more flow nodes. Each flow node specifies a set of packets and an action to be taken on the specified set of packets. They system determines a set of differential flow nodes for the second model based on the flow nodes of the first model and the flow nodes of the second model. Each differential flow node is classified as being one of (i) newly removed, (ii) newly added, and (iii) unaffected. The system verifies a network change based on the determined differential flow nodes.

21 Claims, 10 Drawing Sheets

(56) References Cited

U.S. PATENT DOCUMENTS

| | | | |
|---|---|---|---|
| 8,750,164 | B2 | 6/2014 | Casado et al. |
| 8,942,085 | B1 | 1/2015 | Pani et al. |
| 8,964,569 | B2 | 2/2015 | Jocha et al. |
| 8,971,338 | B2 | 3/2015 | Mishra et al. |
| 9,042,234 | B1 | 5/2015 | Liljenstolpe et al. |
| 9,071,529 | B2 | 6/2015 | Garg et al. |
| 9,225,601 | B2 | 12/2015 | Khurshid et al. |
| 9,276,904 | B2 | 3/2016 | Bansal et al. |
| 9,419,842 | B1* | 8/2016 | Galliher, III ........ H04L 41/0886 |
| 9,667,653 | B2 | 5/2017 | Barabash et al. |
| 9,674,087 | B2 | 6/2017 | Jackson et al. |
| 9,742,666 | B2 | 8/2017 | Zhang et al. |
| 9,755,963 | B2 | 9/2017 | Zhang et al. |
| 9,762,619 | B1 | 9/2017 | Vaidya et al. |
| 10,044,676 | B2 | 8/2018 | Padmanabhan et al. |
| 10,237,172 | B2 | 3/2019 | Zhang et al. |
| 10,587,479 | B2 | 3/2020 | Shakimov et al. |
| 10,680,961 | B2 | 6/2020 | Zhang et al. |
| 10,708,231 | B2 | 7/2020 | Padmanabhan et al. |
| 10,728,085 | B1* | 7/2020 | Chen ................. H04L 41/0659 |
| 2004/0037276 | A1 | 2/2004 | Henderson et al. |
| 2005/0053079 | A1 | 3/2005 | Havala |
| 2005/0135351 | A1 | 6/2005 | Parmar et al. |
| 2006/0029056 | A1 | 2/2006 | Perera et al. |
| 2006/0182037 | A1 | 8/2006 | Chen et al. |
| 2006/0206655 | A1 | 9/2006 | Chappell et al. |
| 2006/0230442 | A1 | 10/2006 | Yang |
| 2008/0148382 | A1 | 6/2008 | Bartholomy et al. |
| 2011/0072506 | A1 | 3/2011 | Law et al. |
| 2011/0137877 | A1 | 6/2011 | Strassner et al. |
| 2011/0320632 | A1 | 12/2011 | Karino |
| 2012/0155467 | A1 | 6/2012 | Appenzeller |
| 2012/0303835 | A1 | 11/2012 | Kempf et al. |
| 2013/0128746 | A1 | 5/2013 | Yedavalli |
| 2013/0163602 | A1 | 6/2013 | Kang et al. |
| 2013/0176630 | A1 | 7/2013 | Mishra et al. |
| 2013/0246655 | A1 | 9/2013 | Itoh |
| 2014/0133305 | A1 | 5/2014 | Brolin et al. |
| 2014/0146674 | A1 | 5/2014 | Wang et al. |
| 2014/0241356 | A1 | 8/2014 | Zhang et al. |
| 2014/0269299 | A1* | 9/2014 | Koornstra ............... H04L 41/12 370/235 |
| 2014/0369209 | A1 | 12/2014 | Khurshid et al. |
| 2015/0009830 | A1 | 1/2015 | Bisht et al. |
| 2015/0016279 | A1 | 1/2015 | Zhang et al. |
| 2015/0016460 | A1 | 1/2015 | Zhang et al. |
| 2015/0043585 | A1 | 2/2015 | Iihoshi et al. |
| 2015/0117454 | A1 | 4/2015 | Koponen et al. |
| 2015/0222446 | A1 | 8/2015 | Suresh et al. |
| 2015/0237013 | A1 | 8/2015 | Bansal et al. |
| 2015/0358434 | A1 | 12/2015 | Parthasarathy et al. |
| 2016/0057014 | A1 | 2/2016 | Thakkar et al. |
| 2016/0057052 | A1 | 2/2016 | Zhang et al. |
| 2016/0112460 | A1 | 4/2016 | Li et al. |
| 2016/0173535 | A1 | 6/2016 | Barabash et al. |
| 2016/0294772 | A1 | 10/2016 | Padmanabhan et al. |
| 2016/0323318 | A1 | 11/2016 | Terrill et al. |
| 2016/0359592 | A1* | 12/2016 | Kulshreshtha ........ H04L 9/3239 |
| 2017/0288966 | A1* | 10/2017 | Chakra ................. H04L 67/306 |
| 2017/0339188 | A1 | 11/2017 | Jain et al. |
| 2017/0346732 | A1 | 11/2017 | Zhang et al. |
| 2018/0063193 | A1 | 3/2018 | Chandrashekhar et al. |
| 2018/0063195 | A1 | 3/2018 | Nimmagadda et al. |
| 2018/0115466 | A1* | 4/2018 | Kazemian ............... H04L 43/50 |
| 2018/0123880 | A1 | 5/2018 | Wen et al. |
| 2018/0123898 | A1* | 5/2018 | Yakuwa ................... H04L 41/12 |
| 2018/0227184 | A1 | 8/2018 | Mentze et al. |
| 2018/0287885 | A1 | 10/2018 | Shakimov et al. |
| 2018/0324093 | A1* | 11/2018 | Namjoshi ............... H04L 41/14 |
| 2018/0375832 | A1 | 12/2018 | Padmanabhan et al. |
| 2019/0036782 | A1 | 1/2019 | Smith |
| 2019/0199623 | A1 | 6/2019 | Zhang et al. |
| 2020/0274752 | A1* | 8/2020 | Shah ................... H04L 12/2863 |
| 2020/0404513 | A1* | 12/2020 | Hayes ...................... H04L 69/28 |
| 2021/0141900 | A1* | 5/2021 | Brown ................. G06F 21/566 |
| 2021/0351982 | A1* | 11/2021 | Albrecht ................. H04L 67/12 |
| 2021/0383297 | A1* | 12/2021 | Ognev .................. G06Q 10/067 |
| 2021/0409271 | A1* | 12/2021 | Jacob Da Silva .. H04L 41/0866 |
| 2022/0006726 | A1* | 1/2022 | Michael ................ H04L 45/123 |
| 2022/0029885 | A1* | 1/2022 | Sadasivarao ........ H04J 14/0227 |
| 2022/0094614 | A1 | 3/2022 | Khurshid et al. |
| 2022/0103427 | A1* | 3/2022 | Mallipudi ............. H04L 41/082 |
| 2022/0150112 | A1* | 5/2022 | Neginhal .............. H04L 45/586 |

OTHER PUBLICATIONS

Gupta, Pankaj, et al., "Packet Classification on Multiple Fields," In Proc. of SIGCOMM, Month Unknown, 1991, 14 pages, Stanford, California, USA.

Krishnaswamy, Umesh, et al., "ONOS Open Network Operating System—An Experimental Open-Source Distributed SDN OS," Apr. 16, 2013, 24 pages.

Pfaff, Ben, et al., "OpenFlow Switch Specification," Sep. 6, 2012, 128 pages, The Open Networking Foundation.

Singh, Sumeet, et al., "Packet Classification Using Mutidimensional Cutting," SIGCOMM '03, Aug. 25-19, 2003, 12 pages, Karlsruhe, Germany.

Xie, Geoffrey G., et al., "On Static Reachability Analysis of IP Networks," Month Unknown, 2005, 14 pages.

Abhashkumar, Anubhavnidhi, et al., "Tiramisu: Fast Multilayer Network Verification," 17th USENIX Symposium on Networked Systems Design and Implementation, Feb. 25-27, 2020, 19 pages, USENIX Association, Santa Clara, CA, USA.

Bjorner, Nikolaj, et al., "ddNF: An Efficient Data Structure for Header Spaces," 12th International Haifa Verification Conference, Nov. 14-17, 2016, 16 pages, HVC, Haifa, Israel.

Dumitrescu, Dragos, et al., "Dataplane Equivalence and its Applications," Proceedings of the 16th USENIX Symposium on Networked Systems Design and Implementation, Feb. 26-28, 2019, 15 pages, USENIX Association, Boston, MA, USA.

Godfrey, Brighten, "How Formal Verification Can Thwart Change-Induced Network Outages," Month Unknown, 2016, 3 pages, CloudTweaks, retrieved from https://cloudtweaks.com/2016/05/formal-verification-thwart-network-outages-breaches/.

Horn, Alex, et al., "A Precise and Expressive Lattice-theoretical Framework for Efficient Network Verification," 2019 IEEE 27th International Conference on Network Protocols, Aug. 24, 2019, 16 pages, IEEE, Chicago, IL.

Horn, Alex, et al., "Delta-net: Real-time Network Verification Using Atoms," Proceedings of the 14th USENIX Symposium on Networked Systems Design and Implementation, Mar. 27-29, 2017, 15 pages, USENIX Association, Boston, MA.

Kazemian, Peyman, et al., "Header Space Analysis: Static Checking for Networks," 9th USENIX Symposium on Networked Systems Design and Implementation, Apr. 25-27, 2012, 14 pages, USENIX Association, San Jose, CA.

Khurshid, Ahmed, et al., "VeriFlow: Verifying Network-Wide Invariants in Real Time," 10th USENIX Symposium on Networked Systems Design and Implementation, Apr. 2-5, 2013, 13 pages, USENIX Association, Lombard, IL.

Lopes, Nuno P., "Checking Beliefs in Dynamic Networks," 12th USENIX Symposium on Networked Systems Design and Implementation, May 4-6, 2015, 14 pages, USENIX Association, Oakland, CA, USA.

Majumdar, Rupak, et al., "Kuai: A Model Checker for Software-defined Networks," 2014 Formal Methods in Computer-Aided Design, Oct. 21-24, 2014, 8 pages, IEEE, Lausanne, Switzerland.

Noghabi, Shadi A., et al., "Samza: Stateful Scalable Stream Processing at LinkedIn," Proceedings of the VLDB Endowment, Aug. 2017, 12 pages, vol. 10, No. 12, VLDB Endowment, Munich, Germany.

Plotkin, Gordon D., et al., "Scaling Network Verification using Symmetry and Surgery," Proceedings of the 43rd Annual ACM SIGPLAN-SIGACT Symposium on Principles of Programming Languages, Jan. 2016, 15 pages, Association for Computing Machinery, New York, NY.

Prabhu, Santhosh, et al., "Plankton: Scalable Network Configuration Verification Through Model Checking," 17th USENIX Sym-

(56) References Cited

OTHER PUBLICATIONS posium on Networked Systems Design and Implementation, Feb. 25-27, 2020, 15 pages, USENIX Association, Santa Clara, CA, USA.

Yang, Hongkun, et al., "Real-Time Verification of Network Properties Using Atomic Predicates," 2013 21st IEEE International Conference on Network Protocols, Oct. 7-10, 2013, 11 pages, IEEE, Goettingen, Germany.

Zeng, Hongyi, et al., "Libra: Divide and Conquer to Verify Forwarding Tables in Huge Networks," Proceedings of the 11th USENIX Symposium on Networked Systems Design and Implementation, Apr. 2-4, 2014, 13 pages, USENIX Association, Seattle, WA, USA.

Zhang, Peng, et al., "Incremental Network Configuration Verification," Proceedings of the 19th ACM Workshop on Hot Topics in Networks, Nov. 4-6, 2020, 7 pages, Association for Computing Machinery, retrieved from https://dl.acm.org/doi/pdf/10.1145/3422604.3425936.

\* cited by examiner

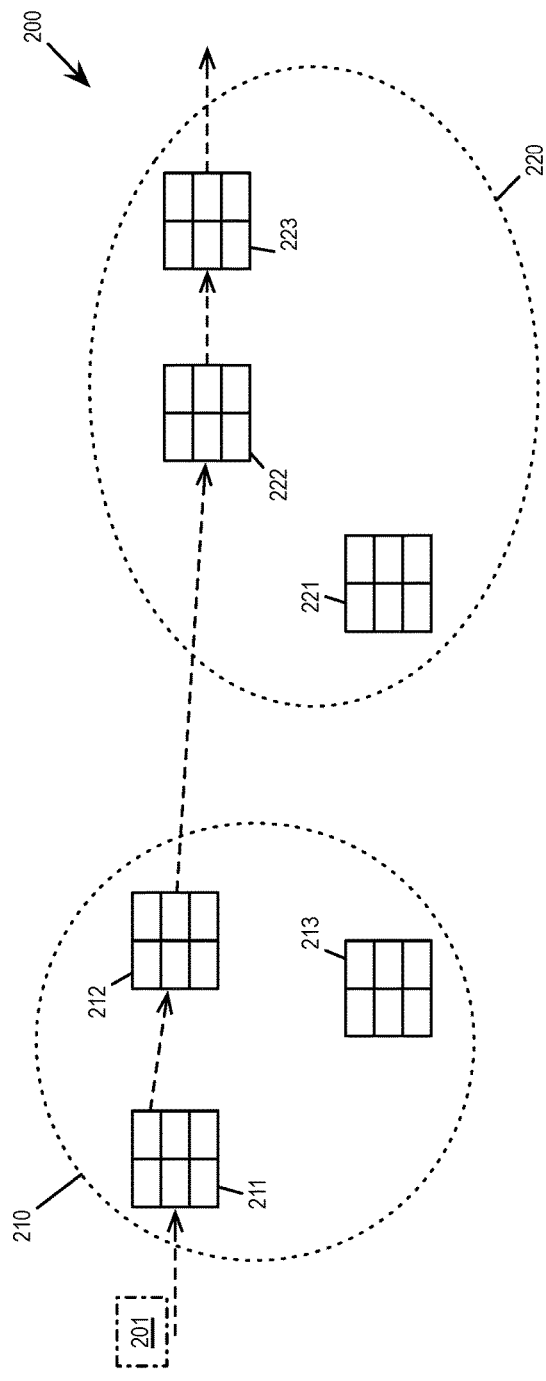
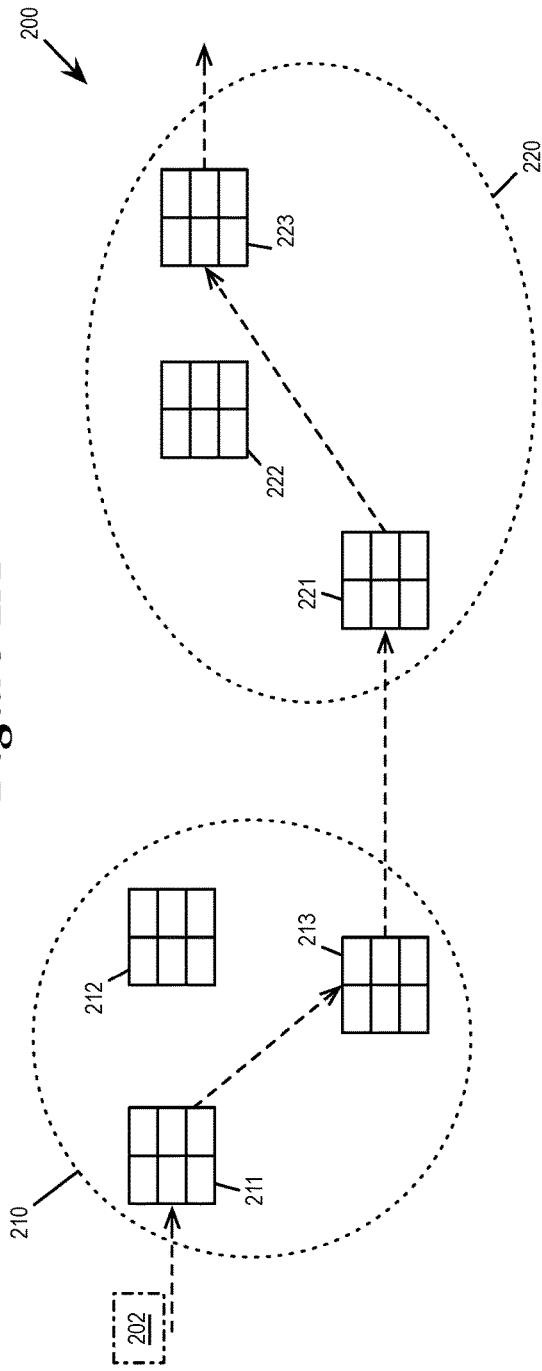
*Figure 2A*
*Figure 2B*

FORMAL VERIFICATION OF NETWORK CHANGES

BACKGROUND

Formal verification is the act of providing or disproving the correctness of intended algorithm or functionality underlying a system by checking it against a certain formal specification or property of the system. Formal verification can be helpful in proving the correctness of systems such as network systems, digital circuits, cryptographic protocols, software, etc. The verification of these systems is done by providing a formal proof on an abstract model of the system. One approach of formal verification is model checking, which consists of a systematic exploration of a mathematical model. Another approach is deductive verification, which consists of generating from the system and its specifications a collection of mathematical proof obligations, the truth of which imply conformance of the system to its specification.

SUMMARY

Some embodiments of the invention provide a network insight system that performs intent verification of network changes. The system generates a first model of a network comprising a first set of one or more rule tables, each rule table described by one or more flow nodes. The system generates a second model of the network comprising a second set of one or more rule tables. Each rule table is described by one or more flow nodes. Each flow node specifies a set of packets and an action to be taken on the specified set of packets. The system determines a set of differential flow nodes for the second model based on the flow nodes of the first model and the flow nodes of the second model. Each differential flow node specifies a set of packets and an action to be taken on the specified set of packets and is associated with a rule table in the first model or the second model. Each differential flow node is classified as being one of (i) newly removed, (ii) newly added, or (iii) unaffected. The system verifies the network change based on the determined differential flow nodes. In some embodiments, the verification of the network change is based on a specified intent for a modification of the network. The first model is constructed based on data captured from the network before the modification, and the second model is constructed based on data captured from the network after the modification.

In some embodiments, the network insight system identifies paths through the network by traversing differential flow nodes in a differential model. Specifically, the system verifies the network changes by checking paths with differential flow nodes that are classified as newly removed or newly added against a specified intent of the network. The system identifies each path by (i) identifying a differential flow node for a set of packets at a first rule table and (ii) following an action specified by the differential flow node to a second rule table.

In some embodiments, the network insight system determines the set of differential flow nodes by identifying a first flow node in the first model that specifies a particular action for a first set of packets. The system then identifies a second, corresponding flow node in the second model that specifies the particular action for a second set of packets. The system then creates a first differential flow node that specifies the particular action for an intersection between the first and second sets of packets, a second differential flow node that specifies the particular action for packets that are in the first set of packets but not in the second set of packets, and a third differential flow node that specifies the particular action for packets that are in the second set of packets but not in the first set of packets. When the particular action is not performed for the first set of packets at the first flow node of the first model, the first and second differential flow nodes are not created. When the particular action is not performed for the second set of packets at the second flow node of the second model, the first and third different flow nodes are not created. The system also classifies the first differential flow node as being unaffected, the second differential flow node as being newly removed, and the third differential flow node as being newly added.

In some embodiments, the network insight system determines the set of differential flow nodes by identifying a first flow node in the first model that specifies first and second actions for a particular set of packets. The system also identifies a second, corresponding flow node in the second model that specifies first and third actions for the particular set of packets. The insight system then creates a first differential flow node that specifies the first action for the particular set of packets and no other actions, a second differential flow node that specifies the second action for the particular set of packets and no other actions, and a third differential flow node that specifies the third action for the particular set of packets and no other actions. The first differential flow node is classified as unaffected, the second differential flow node is classified as newly removed, and the third differential flow node is classified as newly added.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 2A-B conceptually illustrate a network model that uses rule tables to model packet forwarding behavior of the network.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Management of industrial networks is largely based on manual interpretation of loosely defined organizational requirements. A large industrial network typically has many diverse devices and protocols that are separately configured and yet still work together seamlessly. The configuration of an industrial network is done manually by network operators, often based on vaguely defined and constantly changing organizational goals, given to them by a higher decision-making authority. The network operators themselves may also be inheriting the network from others who may have left the organization and therefore unable to completely and accurately state the operational requirements of the network. Consequently, operators are usually unable to formally state network-wide intents that can be used by formal tools to ensure correctness, which hinders the adoption of such tools in real-world networks.

Formal tools for verifying network changes typically involve formally verifying the entire network for correctness or equivalence checking. But formally verifying the entire network for correctness is often unusable in practice. This is because in order to formally verify the entire network, the network operator needs to formally state the correctness requirements for the entire network, which is extremely difficult if not impossible. Equivalence checking usually relies on an automated system to verify that two versions of a system (such as a network) are functionally equivalent. For scenarios where the network is modified by a network operator, equivalence checking is not suitable.

Though network operators are usually unable to define network-wide correctness requirements, they know what changes they intend to make to the network. For example, a network operator may want network changes that affect only secure shell (SSH) traffic. Some embodiments provide a method for formally verifying the correctness of network changes based on a set of specified requirements, rather than a single version of the entire network. In some embodiments, a data plane model is computed by a network assurance and verification component of a network insight system. The network insight system captures the change between two snapshots of a network, and to then verify correctness intents over the change.

Figure 1:
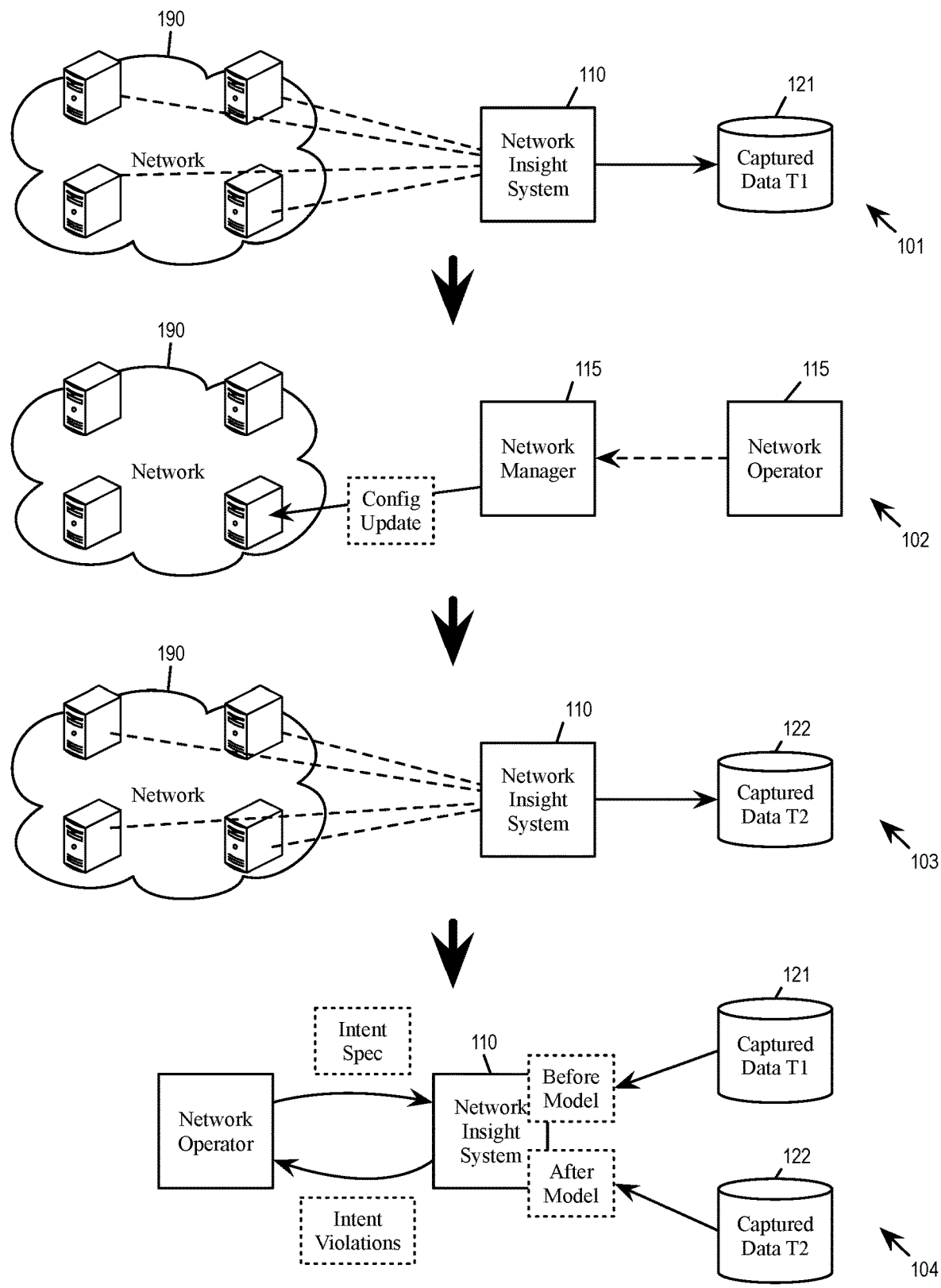
FIG. 1 conceptually illustrates a network insight system that captures two snapshots of a network before and after a change.

FIG. 1 conceptually illustrates a network insight system that captures two snapshots of a network before and after a change. The system also verifies whether the change in the network is operating as intended.

As illustrated, a network insight system 110 is setup to capture data from a network 190. The system may collect static network states such as forwarding tables, configuration data, etc., from various physical and/or virtual devices of the network 190. The system 110 may also receive user input from network operators, who may specify a set of intent statement or specifications regarding the network.

In some embodiments, the network insight system 110 may be configured to periodically capture a snapshot (e.g., a window of data) from the network 190. When a network operator makes a change to the network 190, the insight system 110 may be used to capture data from the network 190 sometime before the change and sometime after the change. In some embodiments, the captured data from before the change is used to generate a first model of the network 190, while the capture data from after the change is used to generate a second model of the network. The insight system 110 uses the two models of the network to identify network behaviors that have changed, specifically packet paths that have been newly removed or newly added.

In four stages labeled 101-104, FIG. 1 shows the insight system using captured data from the network 190 to verify network changes. Stage 101 shows the insight system 110 capturing and storing data from the network 190 over an interval of time at time T1 (captured data 121).

Stage 102 shows a network ma manager 115, at some time instance after T1, making a change to the network 190, by e.g., updating the configuration data of a network entity. Such a network entity may be a physical network appliance, a host machine running virtualization software for hosting managed forwarding elements, etc. The configuration data may change one or more entries of a rule table or forwarding table. The configuration data update effectuates a change in the network 190.

Stage 103 shows the insight system 110 capturing and storing data from the network 190 over an interval of time at time T2 (captured data 122), which occurs after the network change caused by the configuration data update that took place at stage 102.

Stage 104 shows the insight system 110 using the captured data 121 and 122 to identify paths that are affected by the network change. In some embodiments, the network insight system 110 constructs a first network model based on the data captured before the change (captured data 121) and a second network model based on the data captured after the change (captured data 122). In some embodiments, the second network model is that of a proposed change to the network and therefore not constructed based on the data captured from the network 190. Such a second network model may be directly specified by the network operator.

The insight system 110 uses the first and second network models to identify behaviors of the network 190 that have changed. In some embodiments, the insight system identifies packet paths that are in the first model but not in the second model (newly removed paths) and packet paths that are in the second model but not in the first model (newly added paths).

The network insight system 110 may generate a report regarding the change of the network (e.g., a list of the paths affected by the change) for the network operator to determine if the network 190 still functions as intended. In some embodiments, the network insight system 110 may receive a set of intent specification from the network operator and verifies the network changes based on the received intent specification. In some embodiments, the insight system 110 performs this verification by checking the newly removed paths and/or the new added paths to see if they violate the intent specification.

In some embodiments, a network model used for verifying network changes against an intent includes a set of one or more rule tables. In the model, packets are forwarded from one rule table to another according to the entries of the individual rule tables. FIGS. 2A-B conceptually illustrate a network model that uses rule tables to model packet forwarding behavior of the network. The figures illustrate a portion of a network model 200 that models or describes packets being forwarded through a first network entity 210 and a second network entity 220 (they can be routers, switches, firewalls, etc.). As illustrated, the behavior of the first network entity 210 is described by three rule tables 211-213, and the behavior of the second network entity 220 is described by three rule tables 221-223. Each rule table takes different actions to different packets (or different sets of packets) by matching parameters in packet headers with action criteria in entries of the rule table. The action may specify that the packet is to be forwarded to a particular link, or is to be dropped, etc. The network insight system 110 may then model the specified action by e.g., following the specified link to another rule table.

FIG. 2A illustrates the forwarding of a packet 201. The packet 201 has header information that matches an entry in the rule table 211, which causes the packet 201 to be forwarded to the rule table 212. The rule table 212 finds an entry that matches the incoming packet from the rule table 211, which causes the packet to be forwarded to rule table 222, and so forth, until the payload of the packet reaches rule table 223 and exit entity 220. FIG. 2B illustrates the forwarding of a different packet 202. The packet 202 has information that match a different entry in the rule table 211, which causes the packet to be forwarded to the rule table 213 instead of the rule table 212. The rule table 213 then forwards the packet to the rule table 221, and so forth, until the payload of the packet reaches rule table 223 and exit entity 220.

In some embodiments, the behavior of each rule table is described by (or associated with) one or more flow nodes. A flow node represents one unique set of actions that the rule table performs to packets that it processes. Each flow node specifies a set of packets and an action to be taken on the specified set of packets. In some embodiments, a flow node is an encapsulation of the rule table identifier, a set of actions, and the set of packets that undergo those actions at that rule table. In some embodiments, the insight system derives the flow nodes of a rule table from the content of the entries of the rule table.

Figure 3:
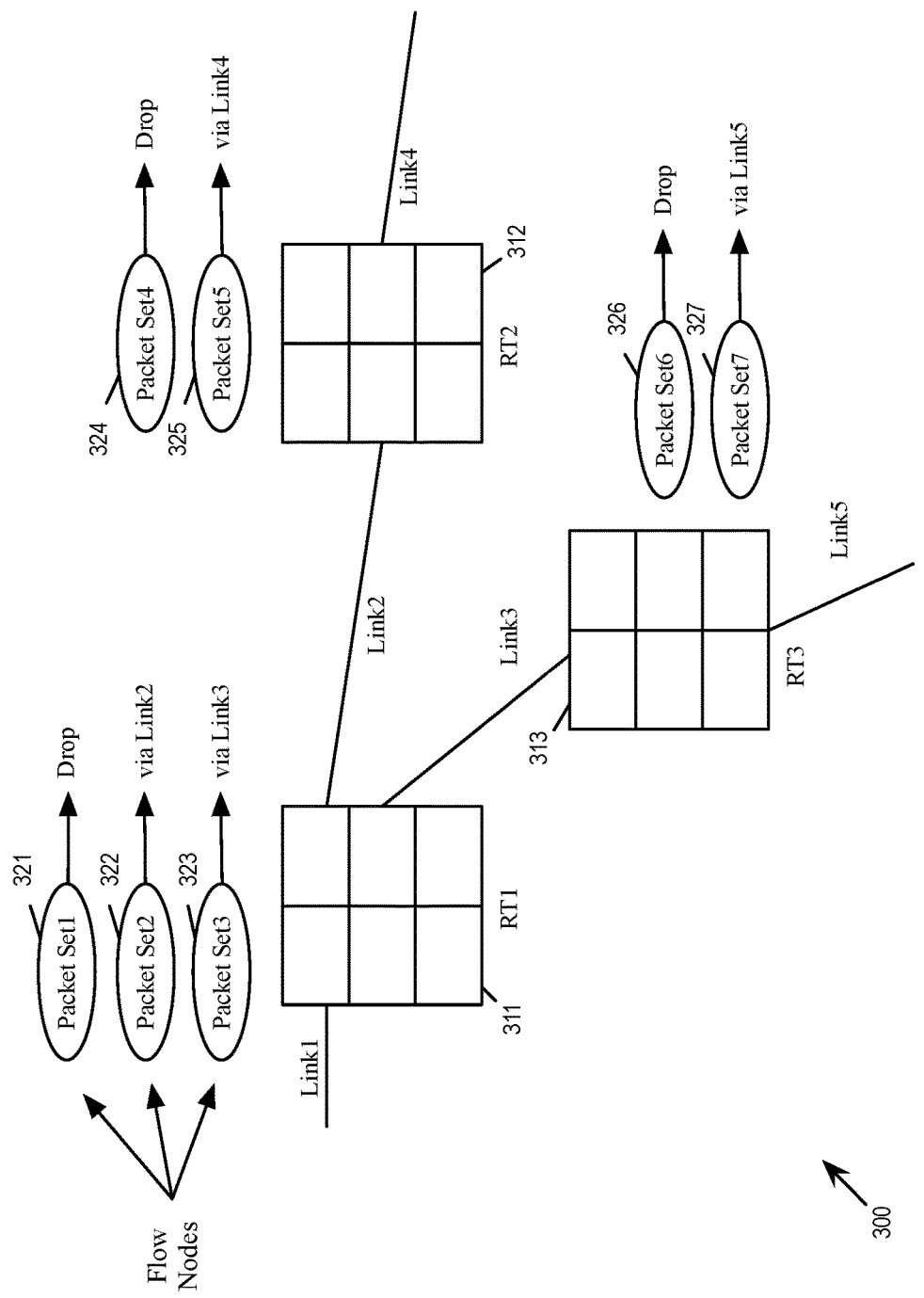
FIG. 3 conceptually illustrates using flow nodes of rule tables to describe behavior of the network.

FIG. 3 conceptually illustrates using flow nodes of rule tables to describe behavior of the network. The figure illustrates portions of a network model 300 that includes three rule tables: RT1 (rule table 311), RT2 (rule table 312), and RT3 (rule table 313). Packets arriving at RT1 at Link1 maybe forwarded via Link2, or Link3, or dropped. Packets arriving at RT2 may be forwarded via Link4 or dropped. Packets arriving at RT3 may be forwarded via Link5 or dropped.

For the model 300, the behaviors of the rule tables 311-313 are specified by flow nodes. Each flow node specifies an action for a packet set, and the rule table performs the specified action (e.g., forwarded via a particular link or dropped) on packets that are classified as belonging to that packet set. In the example of FIG. 3, the behavior of RT1 is described by flow nodes 321-323. The flow node 321 specifies that packets classified as packet set 1 are dropped. The flow node 322 specifies that packets classified as packet set 2 are forwarded via Link2 (to RT2). The flow node 323 specifies that packets classified as packet set 3 are forwarded via Link3. The behavior of RT2 is described by flow nodes 324-325. The flow node 324 specifies that packets classified as packet set 4 are dropped. The flow node 325 specifies that packets classified as packet set 5 are forwarded via Link4. The behavior of RT3 is described by flow nodes 326-327. The flow node 326 specifies that packets classified as packet set 6 are dropped. The flow node 327 specifies that packets classified as packet set 7 are forwarded via Link5.

For example, an access control list (ACL) rule table may have two flow nodes—one with a deny action, and the set of all packets that are denied by the ACL, and the other with an allow action, and the set of all packets that are allowed. A forwarding table will have many flow nodes, one for each type of forwarding behavior, along with the respective packet sets that are handled that way. The sets of packets are termed as equivalence classes, since each set represents a unique type of processing that applies exactly to the packets in that set.

Figure 4:
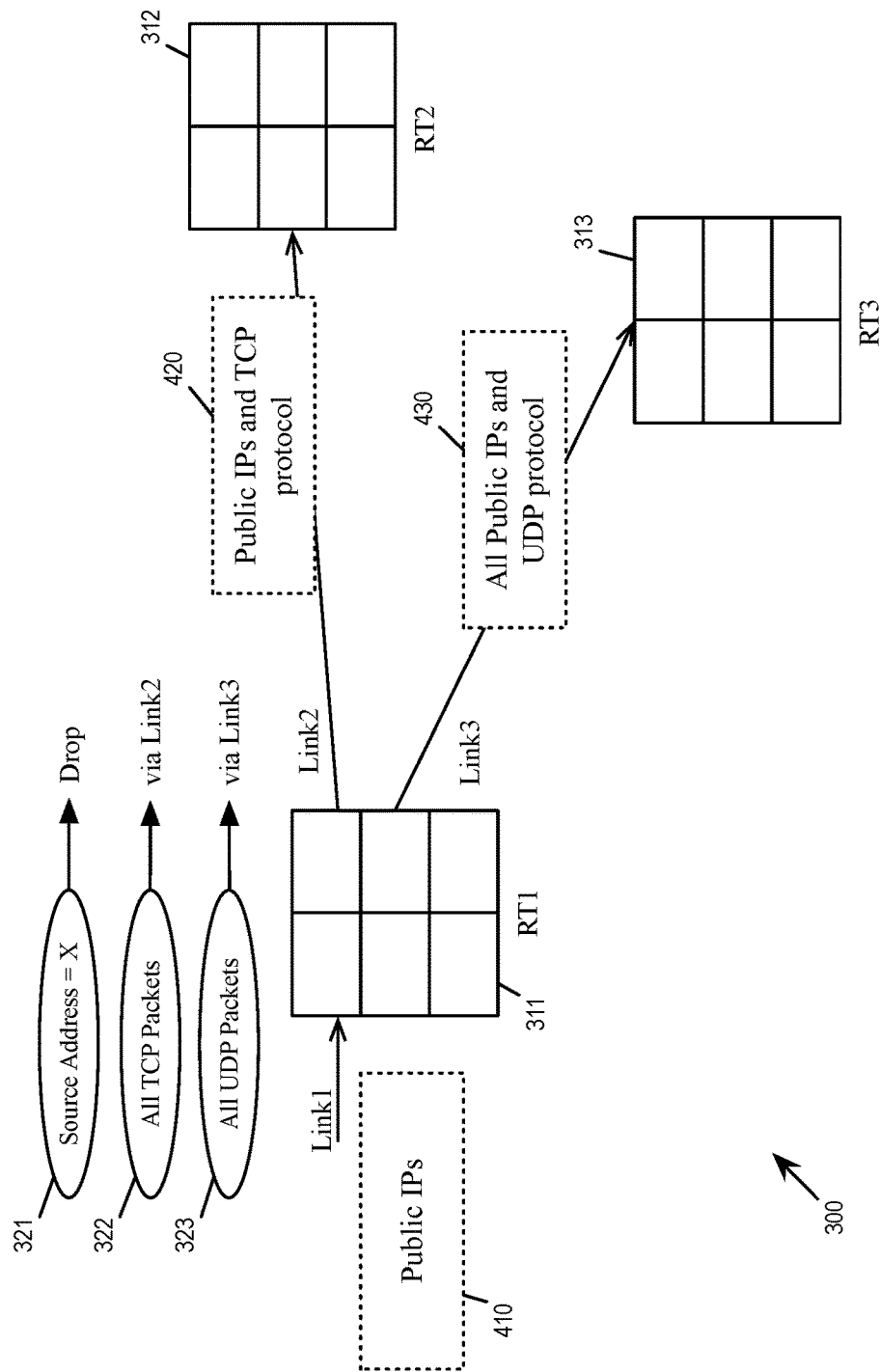
FIG. 4 conceptually illustrates packets being classified and processed by flow nodes.

FIG. 4 conceptually illustrates packets being classified and processed by flow nodes. In this example, the flow node 321 specifies that RT1 drops packets having a source address of X. The flow node 322 specifies that RT1 forwards all TCP packets via Link2 (to RT2). The flow node 323 specifies that RT1 forwards all UDP packets via Link3 (to RT3). When packets having public IPs (packets 410) arrives at RT1, RT1 drops those having a source address X (according to the flow node 321). Of the remaining packets having public IPs, TCP packets (packets 420) are forwarded via Link2 to RT2 (according to the flow node 322), and UDP packets (packets 430) are forwarded via Link3 to RT3 (according to the flow node 323). The insight system 110 may identify one or more packet paths of the network by traversing the rule tables of the network model, specifically by following the flow nodes associated with individual rule tables.

As mentioned, the network insight system captures the change between two snapshots of a network, and to then verify correctness intents over the change. In some embodiments, each snapshot of the network is in a form of a network model that uses flow nodes to describe behavior of rule tables. In some embodiments, the insight system determines a differential network model based on a before-change network model (or before snapshot) and an after-change network model (of after snapshot). The differential network model describes, at each rule table, the actions that have been removed, added or kept unchanged or unaffected by the changes. In some embodiments, the insight system determines a set of differential flow nodes based on the flow nodes of the before-change model and the flow nodes of the after-change model.

Figure 5:
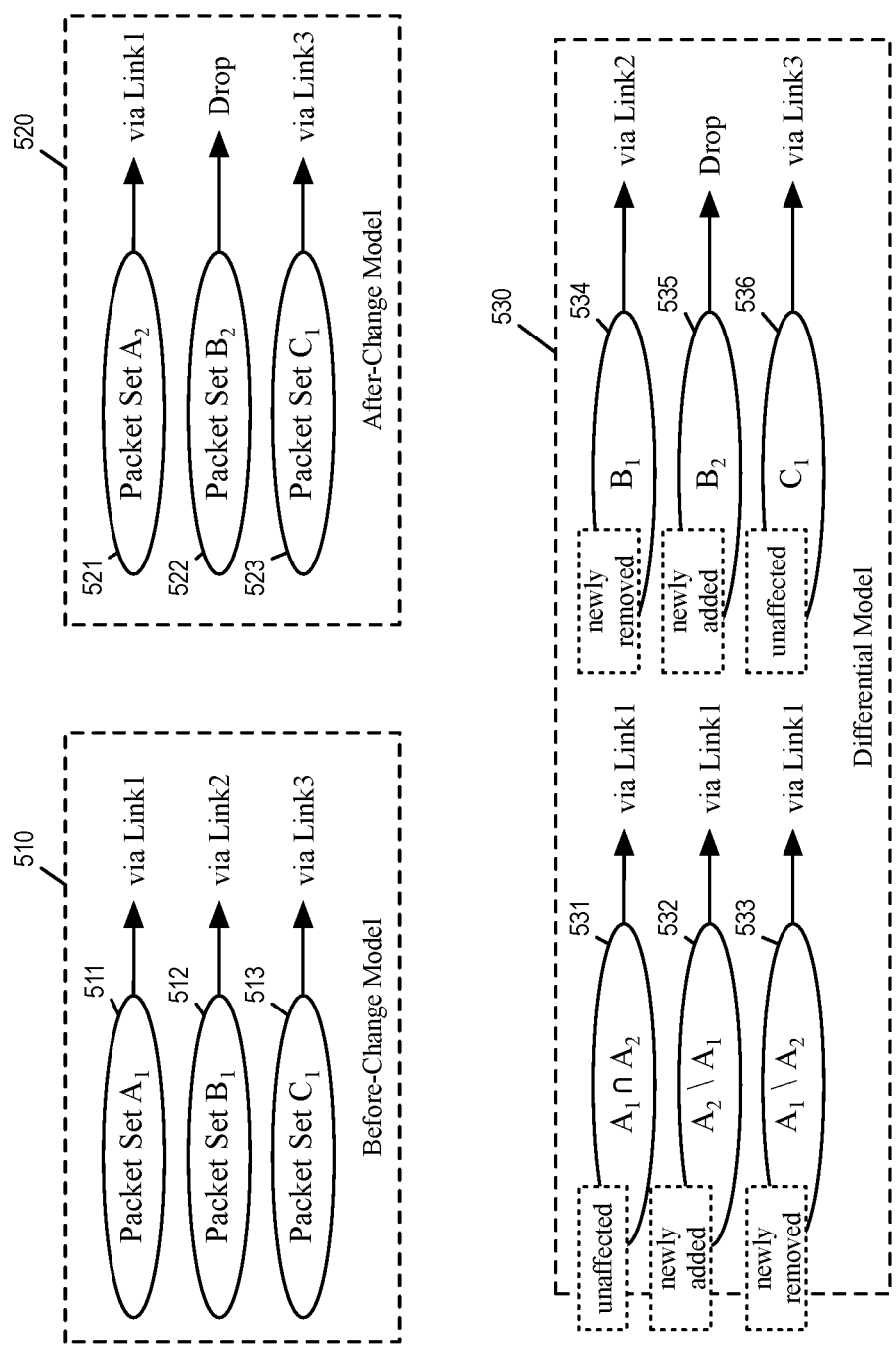
FIG. 5 conceptually illustrates generating differential flow nodes from flow nodes of before-change model and after-change model.

FIG. 5 conceptually illustrates generating differential flow nodes from flow nodes of before-change model and after-change model. The figure illustrates corresponding flow nodes in two models of a network: a before-change model 510 and an after-change model 520. The before-change model 510 includes flow nodes 511-513 of a rule table. The after-change model 520 includes flow nodes 521-523 of a corresponding (or same) rule table.

The flow node 511 specifies that packets belonging to packet set $A_1$ are forwarded through Link1. The flow node 512 specifies that packets belonging to packet set $B_1$ are forwarded through Link2. The flow node 513 specifies that packets belonging to packet set $C_1$ are forwarded through Link3. Flow node 521 specifies that packets belonging to packet set $A_2$ are forwarded through Link1. Flow node 522 specifies that packets belonging to packet set $B_2$ are dropped. Flow node 523 specifies that packets belonging to packet set $C_1$ are forwarded through Link3.

The figure also illustrates a differential model 530 that includes differential flow nodes 531-536 that are derived from the same rule table based on the flow nodes of the before-change and after-change network models. The differential model has rule tables from both the before-change and the after-change models. The network insight system derives the differential flow nodes by identifying flow nodes from the two snapshot models that specifies the same action at the same rule table but for different packet sets (first and second packet sets). The flow nodes identified as having the same action are then used to derive or create (i) a first differential flow node that specifies the particular action for an intersection between the first and second sets of packets, (ii) a second differential flow node that specifies the particular action for packets that are in the first set of packets but not in the second set of packets, and (iii) a third differential flow node that specifies the particular action for packets that are in the second set of packets but not in the first set of packets. Each differential flow node specifies a set of packets and an action to be taken on the specified set of packets and is associated with a rule table in the after-change model.

In the example, the flow node 511 and the flow node 521 both specify the action of "via Link1", so these two flow nodes are used to derive differential flow nodes 531-533. The differential flow node 531 is for packets in intersection $A_1$ and $A_2$ ($A_1 \cap A_2$), the differential flow node 532 is for packets in $A_2$ but not $A_1$ ($A_2 \backslash A_1$), and the differential flow node 533 is for packets in $A_1$ but not $A_2$ ($A_1 \backslash A_2$).

The flow node 512 of the before-change model 510 specifies "via Link2" as its action, but there is no corresponding flow node in the after-change model 520 that specifies the same action. Thus, there is only one differential flow node that is derived for this particular action, namely the flow node 534, which is for packets in $B_1$ to be forwarded "via Link2".

The flow node 522 of the after-change model specifies "drop" as its action for packets in $B_2$, but there is no corresponding flow node in the before-change model 510 that specifies the same action. Thus, there is only one differential flow node that is derived for this particular action, namely the flow node 535, which is for packets in $B_2$ to be dropped.

Both the flow node 513 of the before-change model and the flow node 523 of the after-change model specify the same action "via Link3" for the packet set $C_1$. Thus, there is only one different flow node that is derived for this particular action, namely the flow node 536, which is for packets in $C_1$ to be forwarded via Link3.

As mentioned, each differential flow node is classified and labeled as being one of (i) newly removed, (ii) newly added, or (iii) unaffected. In this example, different flow nodes 531 and 536 are classified and labeled as "unaffected," as these differential flow nodes correspond to behaviors of the rule table that are unaffected by the network change. Differential flow nodes 532 and 535 are classified and labeled as "newly added," as these differential flow nodes correspond to behaviors of the rule table that appear after the network change. Differential flow nodes 533 and 534 are classified and labeled as "newly removed," as these differential flow nodes correspond to behaviors of the rule table that disappear after the network change.

Figure 6:
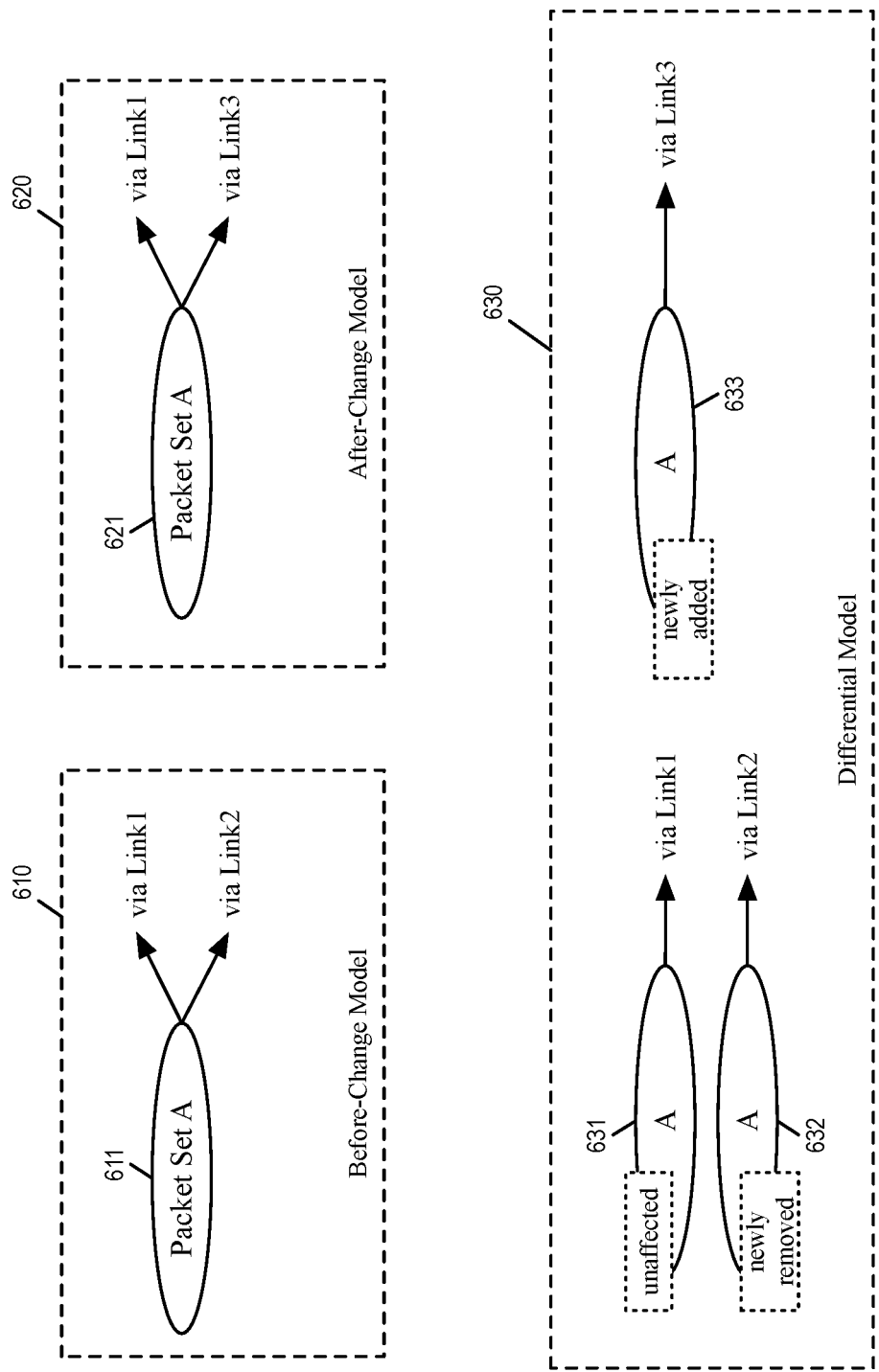
FIG. 6 conceptually illustrates generating differential flow nodes for flow nodes with multiple actions (e.g., a load balancer.)

In some embodiments, a flow node of a rule table may have multiple actions for a given packet set. An example a network entity being modeled by such a flow node is a load balancer implementing equal-cost multiple path (ECMP) operations. FIG. 6 conceptually illustrates generating differential flow nodes for flow nodes with multiple actions, such as a load balancer.

As illustrated, a before-change model 610 has a flow node 611 with two actions "via Link1" and "via Link2" for a particular set of packets (packet set A). A corresponding after-change model 620 has a flow node 621 with two actions "via Link1" and "via Link3" for the same packet set A. In other words, the flow node 611 describes a load balancer performing ECMP using Link1 and Link2, while the flow node 621 describes the load balancer performing ECMP using Link1 and Link3. The first action "via Link1" is common between the before and after change models (i.e., unaffected by the change). The second action "via Link2" is in the before-change model but not in the after-change model (i.e., disappear after the network change.) The third action "via Link3" is in the after-change model but not in the before-change model (i.e., appear after the network change.)

Based on the before-change and after-change models, the network insight system 110 generates a differential model 630. Based on the flow nodes 611 and 621, the insight system 110 creates (i) a first differential flow node 631 that specifies the first action (via Link1) for the particular set of packets (packet set A) and no other actions, (ii) a second differential flow node 632 that specifies the second action (via Link2) for the particular set of packets and no other actions, and (iii) a third differential flow node 633 that specifies the third action (via Link3) for the particular set of packets and no other actions. The differential flow node 631 is classified and labeled as "unaffected." The differential flow node 632 classified and labeled as "newly removed." The differential flow node 633 is classified and labeled as "newly added."

Figure 7:
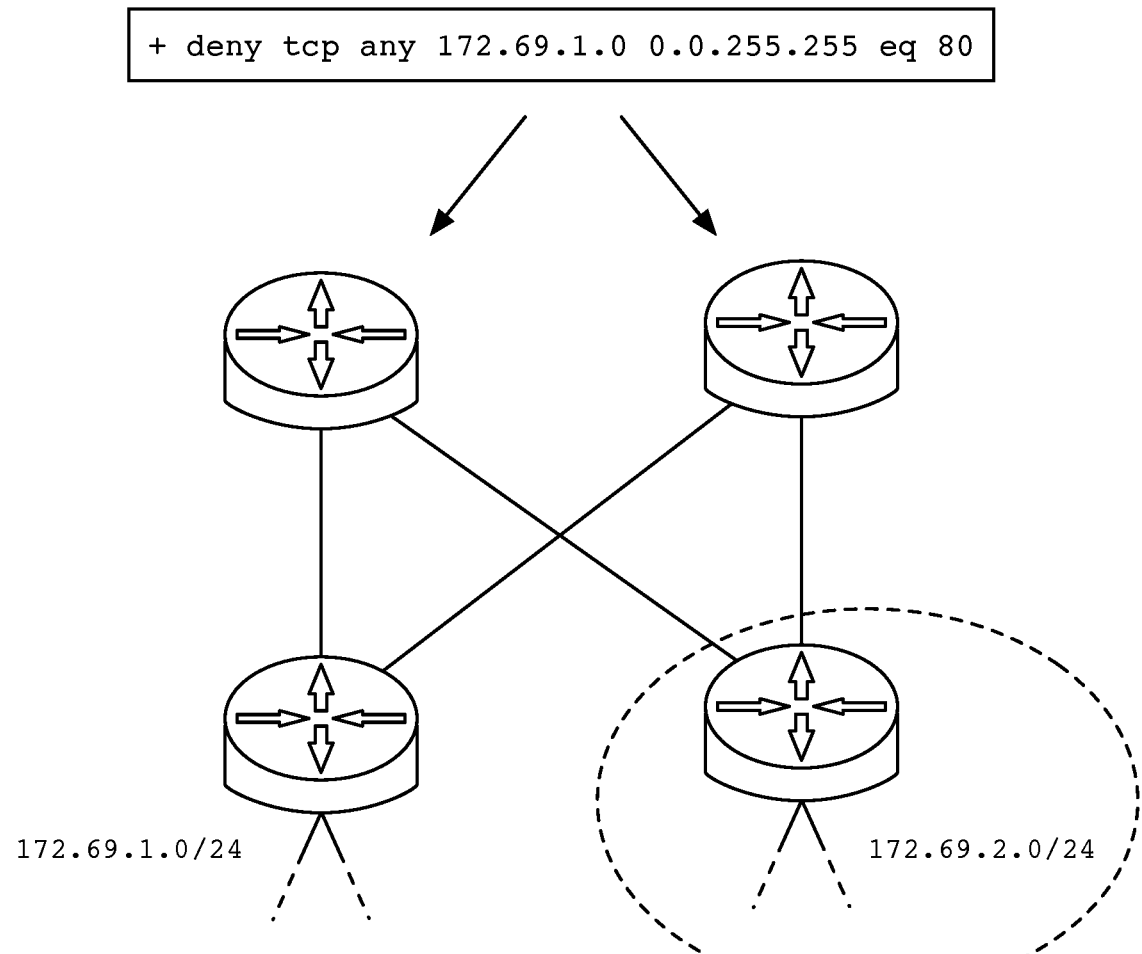
FIG. 7 illustrates an example intent verification of a network change.

As mentioned, the network insight system performs intent verification of changes to network. FIG. 7 illustrates an example intent verification of a network change. The figure illustrates a network change that results in behaviors that violate the network operator's intent. Specifically, the network operator intended for an ACL update to only block packets to 172.69.1.0/24. However, the network change also causes packets to 172.69.2.0/24 to be blocked, violating the network operator's intent. The figure illustrates a possible scenario where HTTP packets do get blocked from the intended destinations, but due to an error, so do HTTP packets to other servers, and causes incorrectness that would not be caught using existing formal verification techniques.

In more general terms, when a change is made to a network, the network insight system verifies that the intended new forwarding behavior has been implemented. The network insight system can also be used to ascertain that no unintended behavior has also been introduced, based on a set of intent specification. In some embodiments, the network insight system checks the "newly added" and/or the "newly removed" differential flow nodes against the intent specification. In some embodiments, the network insight system identifies paths through the network by traversing the rule tables of the network model. The different paths correspond to different packet sets having different header parameters (different source/destination addresses, different protocols, different encapsulations, etc.). The system then verifies the network change based on differential flow nodes that are traversed by the identified paths. Specifically, the insight system checks paths with differential flow nodes that are classified as "newly removed" or "newly added" against a set of intent specification. Examples of intent verification include:

Segmentation: The segmentation intent enforces that traffic starting from a certain set of entry points should never reach certain network locations. In the network insight system, this intent can be checked for paths of specific type (unchanged, newly removed, or newly added), enabling checks such as no path to any critical servers should be removed by the change, or no reachability should be opened from the internet to any internal servers.

Black-hole freedom: This intent is violated when a packet-drop is found. This can be used to check for correctness of access control changes, such as app VMs that are reachable after migration.

Path end-point check: The network insight system enforces that every path that is checked ends in a certain set of endpoints. This is used to verify that all affected paths lead to a certain destination.

Blast radius check: This intent does not look at paths. Instead, it checks all "newly added" and "newly removed" differential flow nodes individually, to verify that the impact of the change is limited to certain subset of traffic. This intent can be used to verify the scope of the change, such as when only SSH traffic is affected.

Figure 8:
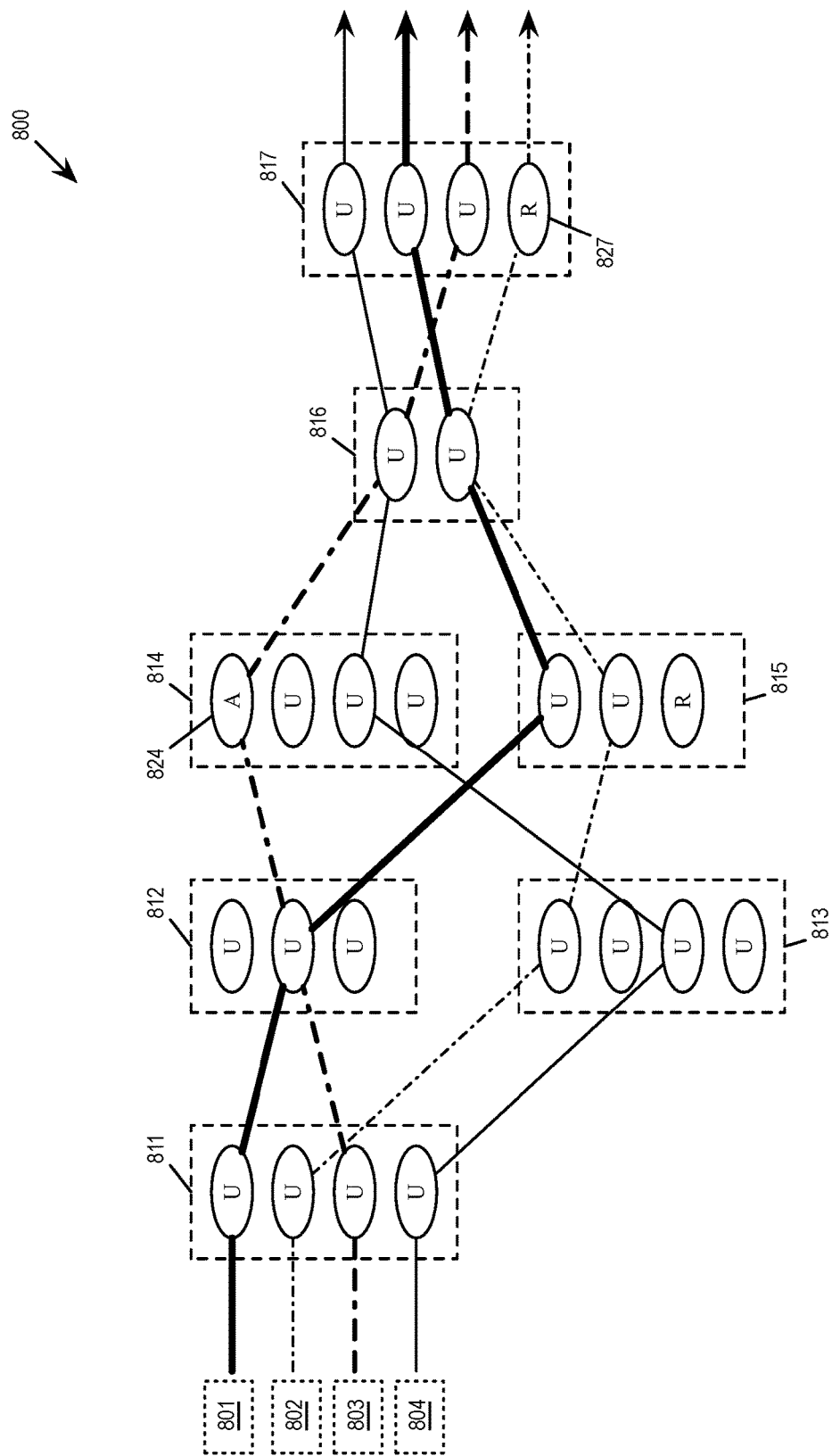
FIG. 8 conceptually illustrates using the classification of differential flow nodes to verify network change based on intent.

FIG. 8 conceptually illustrates using the classification of differential flow nodes to verify network change based on intent. The figure illustrates the network insight system traversing the rule tables 811-817 of a differential model 800. Each rule table is associated with (or has) one or more differential flow nodes that are determined from a before-change model and an after-change model. (The rule tables of the differential model 800 may correspond to the rule tables of the before-change model or the after-change model. Usually, most rule tables are present both in the before-change and after-change models. If a rule table is present in the before-change model but not in the after-change model, the rule table is included in the differential model but with all its flow nodes marked as "newly removed." If a rule table is present in the after-change model but not in the before-change model, the rule table is included in the differential model but with all its flow nodes marked as "newly added." In some embodiments, once the differential model is built, the before-change model and the after-change model are no longer needed. All traversal are conducted based on the differential model.)

Each differential flow node is classified and labeled as either as "U" (unaffected), "A" (newly added), or "R" (newly removed). The traversal identifies several paths through the network, with each path determined according to the action and the match criteria of the differential flow nodes. The figure illustrates four paths based on four different packet sets 801, 802, 803, and 804.

The network insight system may perform one or more types of intent verification. For example, the insight system may perform a blast radius check, i.e., to verify that all differential flow nodes are labeled "A" or "R" to verify that the impact of the change is limited to certain subset of traffic. The insight system may also perform a segmentation check, in which paths with "A" or "R" differential flow nodes are examined based on intent specification to make sure that e.g., no path to any critical servers is removed by the change, or no reachability is opened from the Internet to any internal servers. In the example of FIG. 8, paths for packet sets 801 and 804 goes only through "U" differential flow nodes, indicating that these paths have not been affected by the change and therefore not examined for intent verification.

The path of the packet set 802 goes through an "R" differential flow node 827 of rule table 817, indicating there is a new reachability opened by the network change. The path of the packet set 803 goes through an "A" differential flow node 824 of rule table 814, indicating there is a path removed by the network change. Though not illustrated, in some embodiments, any path that goes through at least one "A" differential flow node and at least one "R" differential flow node is also not examined for intent verification, because such a path represents a combination of the old and new versions of the network.

Figure 9:
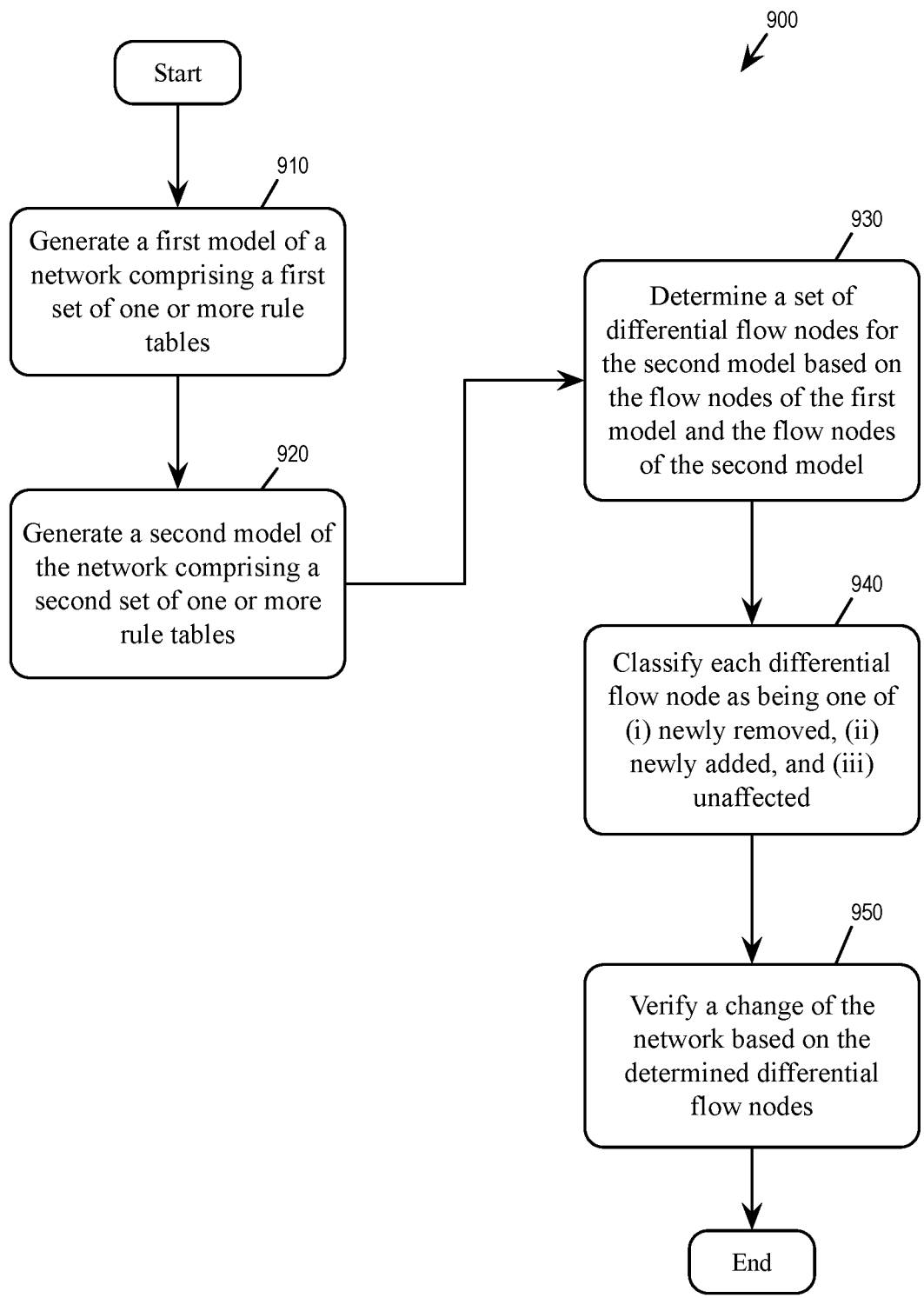
FIG. 9 conceptually illustrates a process for performing intent verification of a network change.

For some embodiments, FIG. 9 conceptually illustrates a process 900 for performing intent verification of a network change. In some embodiments, one or more processing units (e.g., processor) of a computing device implementing the network insight system 110 perform the process 900 by executing instructions stored in a computer readable medium.

In some embodiments, the process 900 starts when the insight system receives (at 910) or generates a first model of a network comprising a first set of one or more rule tables. The insight system generates (at 920) a second model of the network (e.g., after a change to the network due to e.g., configuration change) comprising a second set of one or more rule tables. Each rule table is described by (associated with) one or more flow nodes, each flow node specifying a set of packets and an action to be taken on the specified set of packets. The first model is constructed based on data captured from the network before a network change (or a modification of the network) and the second model is constructed based on data captured from the network after the network change. In some embodiments, the second model may be based on a proposed change of the network and not based on data captured from the actual network.

The insight system determines (at 930) or computes a set of differential flow nodes for the second model based on the flow nodes of the first model and the flow nodes of the second model. Each differential flow node specifies a set of packets and an action to be taken on the specified set of packets and is associated with a rule table in the first model or the second model. Determining differential flow nodes is described by reference to FIGS. 5 and 6.

The insight system classifies (at 940) each differential flow node as being one of (i) newly removed, (ii) newly added, or (iii) unaffected. The insight system verifies (at 950) a change of the network based on the determined differential flow nodes. In some embodiments, the verification of the network change is further based on a specified intent for the network change. In some embodiments, the insight system identifies paths through the network by traversing the rule tables (of the differential model) and verifies the network change based on the differential flow nodes that are traversed by the identified paths. In some embodiments, the identified paths are compared with the specified intent for the modification of the network. In some embodiments, the insight system verifies the network change by checking paths with differential flow nodes that are classified as "newly removed" or "newly added" against a specified intent of the network. The process 900 then ends.

An example of the network insight system in some embodiments is VMware vRealize® Network Insight™, or vRNI. vRNI is part of a network virtualization management system (e.g., VMware NSX-T) that provides management for virtualized networks (e.g., SDN networks). The network insight system provides visualization and analysis capabilities of physical and virtual networks. In some embodiments, the network insight system 110 captures data from virtual network entities that are implemented by host machines running virtualization software, serving as a virtual network forwarding engine.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
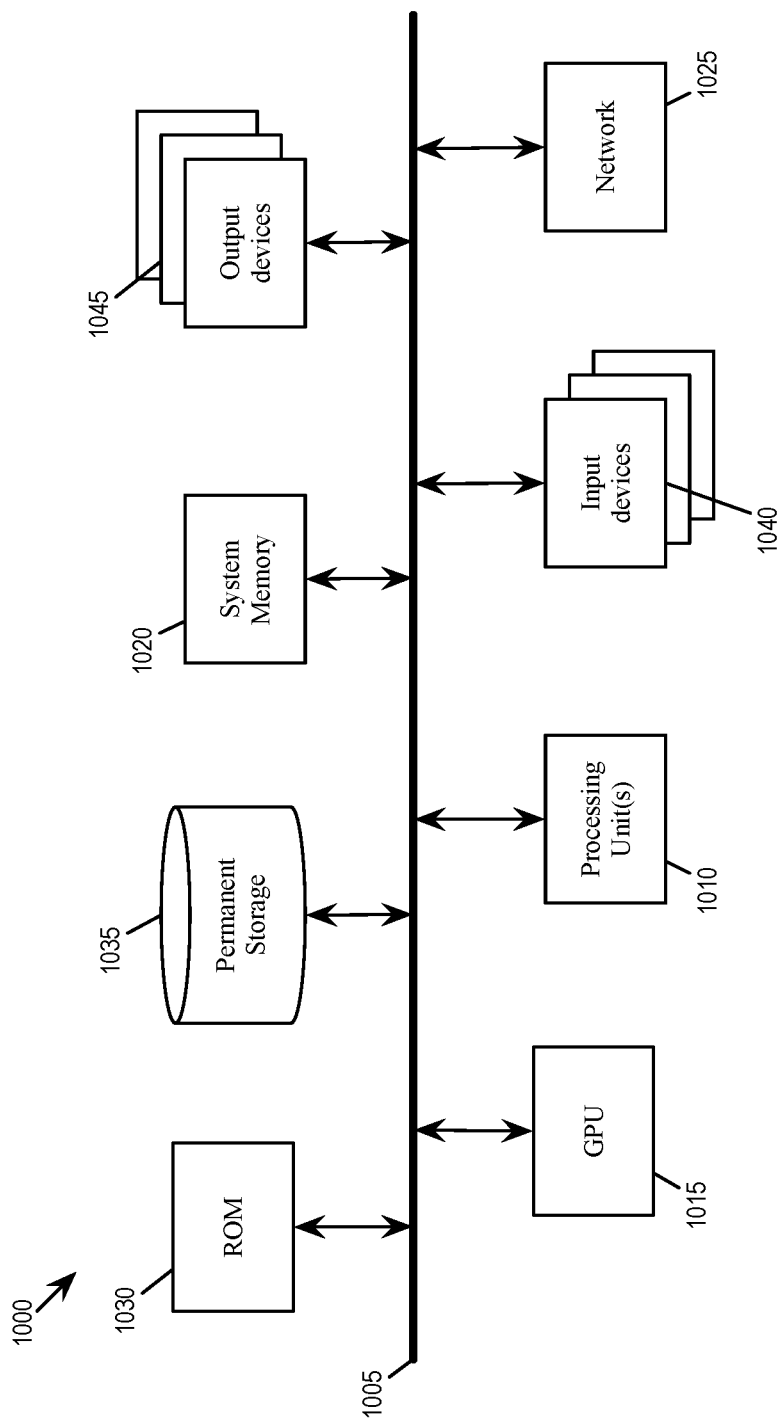
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, and managers. As such, it can be used to execute any of the above-described processes. This computer system 1000 includes various types of non-transitory machine-readable media and interfaces for various other types of machine-readable media. Computer system 1000 includes a bus 1005, processing unit(s) 1010, a system memory 1020, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1020, and the permanent storage device 1035.

From these various memory units, the processing unit(s) 1010 retrieve instructions to execute and data to process in order to execute the processes of the invention. The processing unit(s) 1010 may be a single processor or a multi-core processor in different embodiments. The read-only-memory (ROM) 1030 stores static data and instructions that are needed by the processing unit(s) 1010 and other modules of the computer system 1000. The permanent storage device 1035, on the other hand, is a read-and-write memory device. This device 1035 is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device 1035. Like the permanent storage device 1035, the system memory 1020 is a read-and-write memory device. However, unlike storage device 1035, the system memory 1020 is a volatile read-and-write memory, such as random access memory. The system memory 1020 stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices 1040 enable the user to communicate information and select commands to the computer system 1000. The input devices 1040 include alphanumeric keyboards and pointing devices (also called "cursor control devices"). The output devices 1045 display images generated by the computer system 1000. The output devices 1045 include printers and display devices, such as cathode ray tubes (CRT) or liquid crystal displays (LCD). Some embodiments include devices such as a touchscreen that function as both input and output devices 1040 and 1045.

Finally, as shown in FIG. 10, bus 1005 also couples computer system 1000 to a network 1025 through a network adapter (not shown). In this manner, the computer 1000 can be a part of a network of computers (such as a local area network ("LAN"), a wide area network ("WAN"), or an Intranet, or a network of networks, such as the Internet. Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments described above include various pieces of data in the overlay encapsulation headers. One of ordinary skill will realize that other embodiments might not use the encapsulation headers to relay all of this data.

Also, several figures conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method comprising:
   generating a first model of a network comprising a first set of one or more rule tables, wherein the network comprises a plurality of network elements that forwards packets based on rule tables;
   generating a second model of the network comprising a second set of one or more rule tables, wherein each rule table is described by one or more flow nodes, each flow node specifying a set of packets and an action to be taken on the specified set of packets;
   determining a set of differential flow nodes for the second model based on the flow nodes of the first model and the flow nodes of the second model; and
   verifying a network change based on the determined differential flow nodes;
   wherein determining the set of differential flow nodes comprises:
     identifying a first flow node in the first model that specifies a particular action for a first set of packets; and
     identifying a second, corresponding flow node in the second model that specifies the particular action for a second set of packets;
   creating a first differential flow node that specifies the particular action for an intersection between the first and second sets of packets;
   creating a second differential flow node that specifies the particular action for packets that are in the first set of packets but not in the second set of packets; and
   creating a third differential flow node that specifies the particular action for packets that are in the second set of packets but not in the first set of packets.

2. The method of claim 1, wherein the verification of the network change is further based on a specified intent for a modification of the network, wherein the first model is constructed based on data captured from the network before the modification and the second model is constructed based on data captured from the network after the modification.

3. The method of claim 1, wherein each differential flow node specifies a set of packets and an action to be taken on the specified set of packets and is associated with a rule table in the first model or the second model.

4. The method of claim 1, wherein each differential flow node is classified as being one of (i) newly removed, (ii) newly added, and (iii) unaffected.

5. The method of claim 4, further comprising:
   identifying paths through the network by traversing the differential flow nodes; and
   verifying the network change based on differential flow nodes that are traversed by the identified paths.

6. The method of claim 4, wherein verifying the network change comprises checking paths with differential flow nodes that are classified as newly removed or newly added against a specified intent of the network.

7. The method of claim 1, wherein identifying a path comprises (i) identifying a differential flow node for a set of packets at a first rule table and (ii) following an action specified by the differential flow node to a second rule table.

8. The method of claim 1, wherein when the particular action is not performed for the first set of packets at the first flow node of the first model, the first and second differential flow nodes are not created.

9. The method of claim 1, wherein when the particular action is not performed for the second set of packets at the second flow node of the second model, the first and third different flow nodes are not created.

10. The method of claim 1, further comprising:
    classifying the first differential flow node as being unaffected;
    classifying the second differential flow node as being newly removed; and
    classifying the third differential flow node as being newly added.

11. The method of claim 1, wherein determining the set of differential flow nodes further comprises:
    identifying a first flow node in the first model that specifies first and second actions for a particular set of packets;
    identifying a second, corresponding flow node in the second model that specifies first and third actions for the particular set of packets;
    creating a first differential flow node that specifies the first action for the particular set of packets and no other actions;
    creating a second differential flow node that specifies the second action for the particular set of packets and no other actions; and
    creating a third differential flow node that specifies the third action for the particular set of packets and no other actions.

12. The method of claim 11, further comprising:
    classifying the first differential flow node as being unaffected;
    classifying the second differential flow node as being newly removed; and
    classifying the third differential flow node as being newly added.

13. The method of claim 1, wherein the plurality of forwarding elements comprises a plurality of routers.

14. The method of claim 1, wherein the plurality of forwarding elements comprises a plurality of switches.

15. A computing device comprising:
    one or more processors; and
    a computer-readable storage medium storing a plurality of computer-executable components that are executable by the one or more processors to perform a plurality of actions, the plurality of actions comprising:
generating a first model of a network comprising a first set of one or more rule tables;
generating a second model of the network comprising a second set of one or more rule tables, wherein each rule table is described by one or more flow nodes, each flow node specifying a set of packets and an action to be taken on the specified set of packets;
determining a set of differential flow nodes for the second model based on the flow nodes of the first model and the flow nodes of the second model; and
verifying a network change based on the determined differential flow nodes;
wherein determining the set of differential flow nodes comprises:
identifying a first flow node in the first model that specifies a particular action for a first set of packets;
identifying a second, corresponding flow node in the second model that specifies the particular action for a second set of packets;
creating a first differential flow node that specifies the particular action for an intersection between the first and second sets of packets;
creating a second differential flow node that specifies the particular action for packets that are in the first set of packets but not in the second set of packets; and
creating a third differential flow node that specifies the particular action for packets that are in the second set of packets but not in the first set of packets.

16. The computing device of claim 15, wherein the verification of the network change is further based on a specified intent for a modification of the network, wherein the first model is constructed based on data captured from the network before the modification and the second model is constructed based on data captured from the network after the modification.

17. The computing device of claim 15, wherein each differential flow node specifies a set of packets and an action to be taken on the specified set of packets and is associated with a rule table in the first model or the second model.

18. The computing device of claim 15, wherein each differential flow node is classified as being one of (i) newly removed, (ii) newly added, and (iii) unaffected.

19. The computing device of claim 18, further comprising:
identifying paths through the network by traversing the differential flow nodes; and
verifying the network change based on differential flow nodes that are traversed by the identified paths by checking paths with differential flow nodes that are classified as newly removed or newly added against a specified intent of the network.

20. The computing device of claim 15, wherein identifying a path comprises (i) identifying a differential flow node for a set of packets at a first rule table and (ii) following an action specified by the differential flow node to a second rule table.

21. A non-transitory machine-readable medium storing a program for execution by at least one hardware processing unit, the program comprising sets of instructions for:
generating a first model of a network comprising a first set of one or more rule tables;
generating a second model of the network comprising a second set of one or more rule tables, wherein each rule table is described by one or more flow nodes, each flow node specifying a set of packets and an action to be taken on the specified set of packets;
determining a set of differential flow nodes for the second model based on the flow nodes of the first model and the flow nodes of the second model; and
verifying a network change based on the determined differential flow nodes;
wherein determining the set of differential flow nodes comprises:
identifying a first flow node in the first model that specifies a particular action for
a first set of packets;
identifying a second, corresponding flow node in the second model that specifies the particular action for a second set of packets;
creating a first differential flow node that specifies the particular action for an intersection between the first and second sets of packets;
creating a second differential flow node that specifies the particular action for packets that are in the first set of packets but not in the second set of packets; and
creating a third differential flow node that specifies the particular action for packets that are in the second set of packets but not in the first set of packets.

* * * * *